Feb. 25, 1964   C. M. ROWLAND   3,122,153
PNEUMATIC SPEED SENSOR
Filed Nov. 25, 1960   2 Sheets-Sheet 1
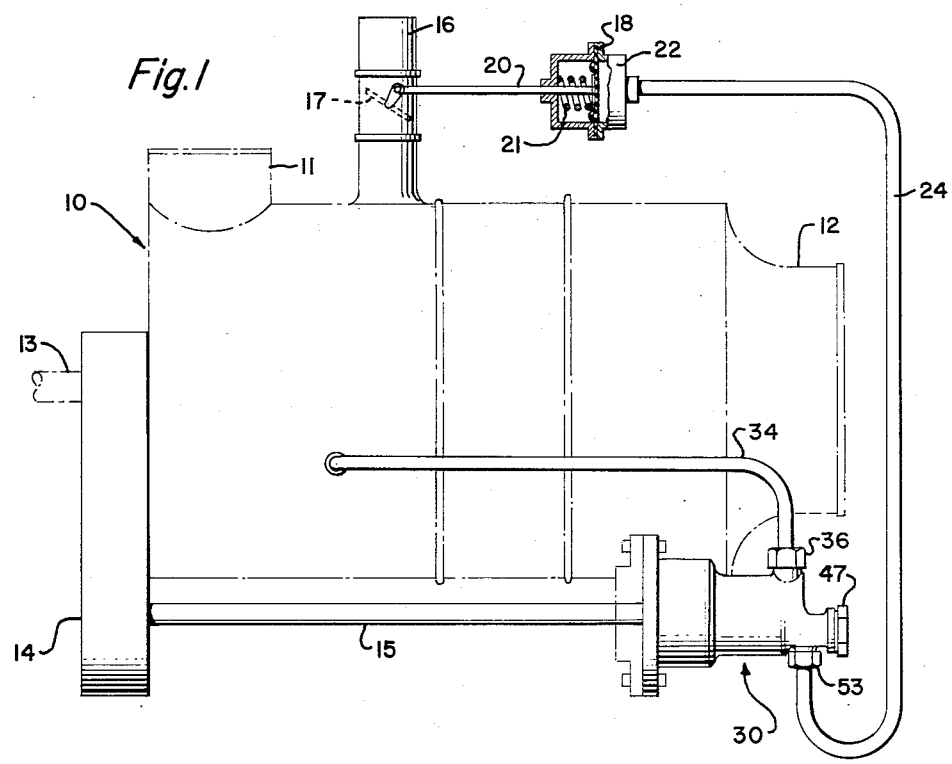
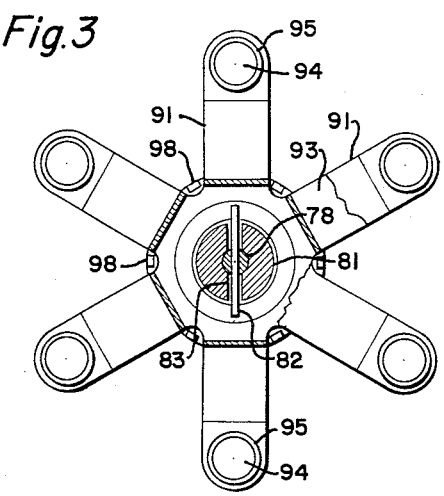
INVENTOR
CHARLES M. ROWLAND
BY
*Francis W. Beker*
ATTORNEY

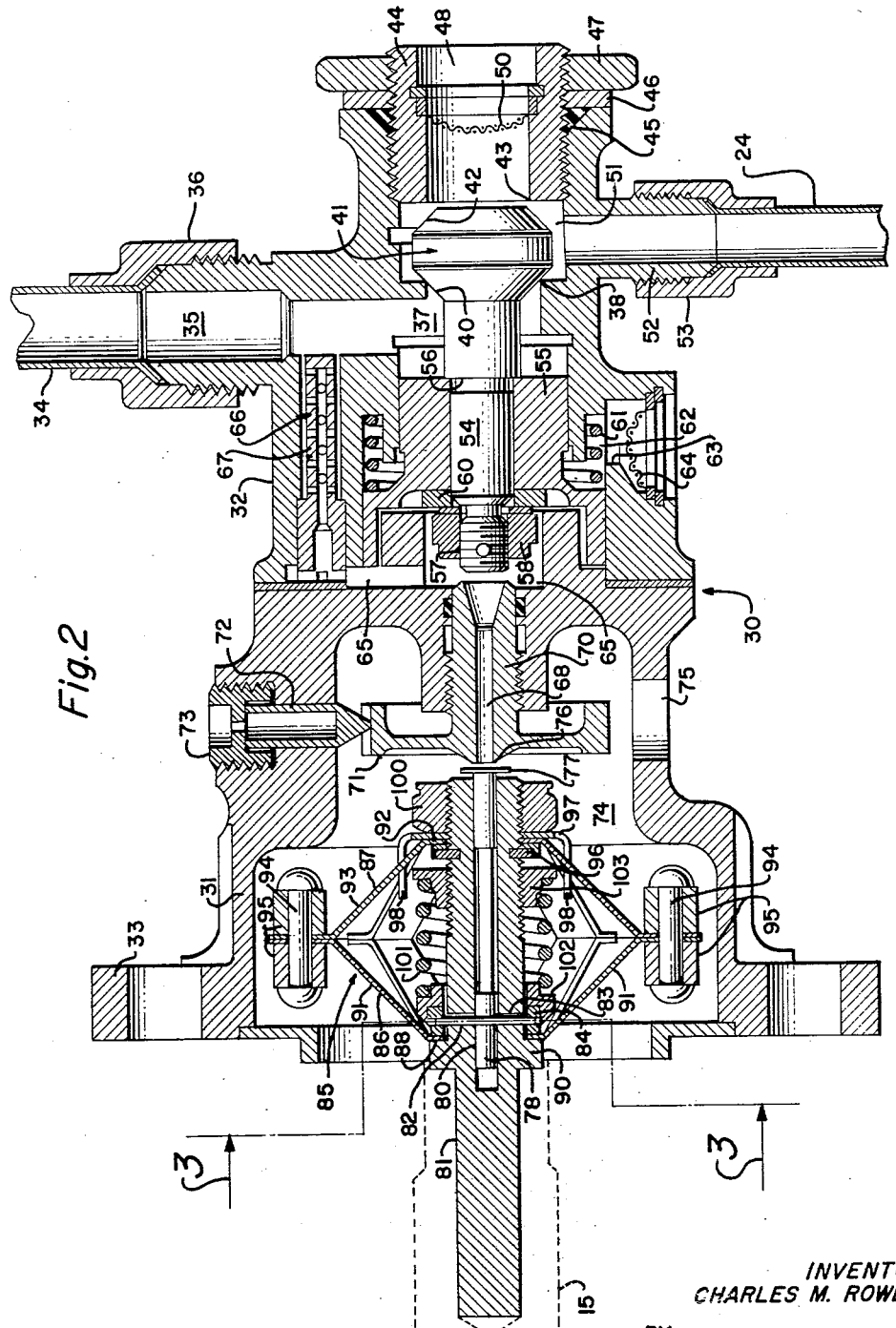

United States Patent Office 3,122,153
Patented Feb. 25, 1964

3,122,153
PNEUMATIC SPEED SENSOR
Charles M. Rowland, Phoenix, Ariz., assignor to The Garrett Corporation, Los Angeles, Calif., a corporation of California
Filed Nov. 25, 1960, Ser. No. 71,815
4 Claims. (Cl. 137—56)

This invention relates to pneumatic speed sensing and controlling mechanisms. It is more particularly directed to apparatus for pneumatically controlling certain aspects of operation of air motors, turbines, and similar fluid pressure operated devices in response to the speed thereof.

In the operation of high speed machinery, there are often signals and other devices that it is desired to have function at certain speeds. For example, when starting a combination multistage compressor and gas turbine, there is a tendency for pressure surges to develop at certain speeds. This tendency is reduced or eliminated if the compressor is vented to the atmosphere until a predetermined shaft speed is attained. The vent may then be closed and the starting operation completed without difficulty. To accomplish such closing of a vent obviously requires a precise control so that it may be arranged to take place at the proper predetermined speed of rotation of the turbine shaft.

While there are many different types of speed sensors and controls available for applications such as that just described, certain of them make use of a hollow shaft for transmitting the pneumatic pressure to the control device. These require rotary pneumatic seals which are difficult to maintain. Also, prior devices usually have been arranged to function over wide ranges of speed and are therefore not necessarily adaptable to effect a precise control at a predetermined speed. Moreover, some of the earlier devices for this purpose are unsymmetrical and therefore difficult to balance. In addition, where fluid valves are to be controlled, it is often the practice to have the movable valve member and seat in rubbing or sliding frictional contact with one another and thus subject to wear.

It is an object of this invention to provide a pneumatic speed control device for a turbine engine, which device is rugged and simple in construction and adapted to give a signal or actuating movement at a predetermined precise speed of rotation of the turbine shaft and provide reliable operation for a maximum time without adjustment or servicing.

Another object of this invention is to provide a pneumatic control mechanism which includes a pressure chamber, a valve therefor, and a centrifugally responsive actuator for the valve, the construction being free of any hollow shafts, rotary pneumatic seals and/or frictional contact of the movable valve and seat.

A further object of the invention is to provide a pneumatic speed sensor having a valve which is adapted to be moved in response to centrifugal force, wherein the valve actuator includes a plurality of symmetrically arranged leaf spring flyweight members so as to provide simple and effective balancing for precise operation.

Still another object is to provide a pneumatic control mechanism which includes a pressure chamber, a centrifugally responsive means for regulating the pressure in said chamber, and a poppet valve adapted to be actuated when the pressure in said chamber reaches a predetermined value.

The above and other objects of the invention will be apparent from the following description and the accompanying drawings, in which:

FIG. 1 is a schematic view of a gas turbine compressor utilizing a pneumatic speed sensor and control embodying the principles of this invention;

FIG. 2 is a vertical sectional view of the pneumatic speed sensor shown in FIG. 1; and FIG. 3 is a vertical sectional view taken along the line 3—3 of FIG. 2.

Referring now to FIG. 1, a gas turbine compressor 10 is shown in phantom outline as having an inlet 11 for receiving atmospheric or ram air and leading it to the compressor section thereof. Such air may then flow through the several stages of the compressor, to the turbine and finally may be discharged through an exhaust 12 at the outlet end of the turbine. The turbine includes a main shaft 13 which is rotated thereby and drives a transmission 14 so as to reduce the speed to a driven shaft 15 from about 14,000 r.p.m. at the turbine shaft to about 4500 r.p.m. During the starting of a multistage compressor, surges frequently develop and may cause difficulty in the starting operation and even damage to the turbine; but such surges may be prevented by the provision of a vent 16 under the control of a butterfly valve 17. With a normal main shaft speed of 14,000 r.p.m., it is now the practice to maintain the butterfly valve 17 in an open position until the shaft reaches a speed of about 12,000 r.p.m. and thereby prevent surging. At that speed, valve 17 may be closed by means of a pneumatic actuator 18 and the starting of the turbine may then be concluded without difficulty. Any type of pneumatic actuator may be used to close the valve 17, that shown being a conventional construction having an actuating rod 20 connected to the butterfly valve and arranged to hold said valve in open position by means of a spring 21. Actuating rod 20 may be moved so as to close butterfly valve 17 in response to fluid pressure supplied to a diaphragm chamber 22 through a conduit 24, as will hereinafter be more fully explained.

In order to supply a fluid pressure impulse for closing the butterfly valve 17 at the selected precise speed, a speed sensor, designated generally by the reference numeral 30 and embodying the principles of this invention, may be mounted on the side of the engine 10 and operatively connected to the shaft 15. In FIG. 2, speed sensor 30 is shown as comprising a main housing section 31 and a pressure chamber housing section 32 secured thereto in any convenient manner. Flanges 33 are provided on the housing section 31 so that it may be mounted on the side of the engine 10 or transmission 14. Fluid under pressure is supplied to the housing section 32 from a suitable outlet on the compressor through a conduit 34 to an inlet passage 35 in the housing section 32, said conduit 34 being attached to the housing section 32 by an adaptor nut 36.

Inlet passage 35 adjoins and is connected to a valve chamber 37 which is provided with a valve seat 38 adapted to be closed by contact with a sloping inlet valve surface 40 provided on a poppet valve 41. Poppet valve 41 also has a second or outlet face 42 formed thereon for engagement with a valve seat 43 provided on an outlet member 44 which is adjustably threaded into the housing 32 and sealed with a suitable packing 45, washer 46 and lock nut 47. Outlet member 44 has an axially aligned cylindrical outlet passage 48 which vents to the ambient atmosphere and may be protected with a suitable dust screen 50, if desired. When the poppet valve 41 is actuated so that face 40 moves away from seat 38 and the outlet face 42 moves into contact with the outlet seat 43, fluid under pressure may then pass from the valve chamber 37 into an outlet chamber 51. This chamber is connected through a threaded nipple 52 with the conduit 24 by a suitable adaptor nut 53 and thus provides fluid communication between the valve chamber 37 or inlet 35 and the pneumatic actuator 18.

Actuating movement of the poppet valve is effected through a stem 54 formed on the valve member and connected to an actuating plunger 55 which is mounted for limited sliding movement in a suitable cylindrical opening provided in the housing section 32. To hold the poppet valve in the actuating plunger, the stem 54 has a shoulder 56 engaging said actuating plunger on one side thereof, and, on the other side, is provided with a reduced portion 57 which may be threaded for the reception of a cooperating lock nut 58. Valve stem 54 may be maintained in fluid tight relation with the actuating plunger 55 by means of a suitable washer or packing 60 provided adjacent to the lock nut 58.

Valve seat 38 and valve face 40 are normally held in their closed positions by a helical spring 61 mounted in an annular chamber 62 surrounding the actuating plunger 55. This chamber 62 may be vented to the atmosphere through an outlet 63 having a suitable dust screen 64 therein, if desired. The reduced threaded portion 57 of the valve stem 54 together with its lock nut 58 are disposed in a pressure chamber 65 formed in the housing 32. Fluid under pressure flows from the inlet 35 to the pressure chamber 65 through a special passage 66 provided in the housing 32 and having a combined air strainer and restricted orifice member 67 mounted therein adjacent to the inlet passage 35.

Pressure in the pressure chamber 65 is regulated or controlled by controlling the fluid flow through an elongated passage terminating in an orifice 68. This orifice is formed in an adjustable supporting member 70 which is threaded in a corresponding opening provided in the housing section 31. A large serrated adjusting wheel 71 is provided on the supporting member 70 for cooperation with a pointed locking pin 72 which may be held in any adjusted position by a locking screw 73 threaded into the housing section 31. The adjusting wheel 71 is disposed in a chamber 74 formed in the housing 31 and vented to the atmosphere through an opening 75. Orifice 68 terminates in an outlet surface or seat 76 so that the flow through said orifice may be regulated by means of a cooperating regulating member 77.

In accordance with the present invention, fluid flow through the orifice 68 is regulated in response to the speed of the shaft 15 with the result that pressure in the chamber 65 is regulated in response to such speed. Thus, flow regulating member 77, in the form shown, comprises a disk formed or mounted on the end of a pin 78 which is slidably received in a correspondingly shaped recess 80 provided in a shaft or carrying member 81. Shaft 81 constitutes a rotatable element or support and is shaped to be suitably attached for rotation in unison with the shaft 15. In order to move the regulating member 77 in response to the speed of the shaft 15, said regulating member 77 is operatively connected to a pin 82 extending through the rod 78 for restricted movement in a machined slot 83 formed in the rotatable element 81. It will be apparent that the machined slot 83 limits the back and forth movement of the actuating rod 78 and is of such width that the disk on the end of the orifice regulating member 77 will not touch the seat or outlet surface 76 when the supporting member 70 is properly adjusted. Consequently, there will be no wear due to frictional contact between the disk and the outlet surface 76.

Pin 82 is operatively connected with a ring or collar 84 which constitutes the base for the movable side of a centrifugally responsive flyweight device 85. This device includes an inner resilient member 86 and an outer resilient member 87. As shown in FIGS. 2 and 3, the inner resilient member 86 has a hub 88, positioned between the collar 84 and an annular abutment 90 formed on the shaft 81, and a plurality of angularly disposed fingers or spokes 91. Similarly, outer resilient member 87 has a hub 92 and a plurality of angularly disposed resilient fingers or spokes 93, corresponding in number and general arrangement with the spokes 91. Fingers or spokes 91 and 93 are bent at their ends so that they may be attached together by suitable rivets 94 and collars 95 which are the flyweights responsive to centrifugal force. Hub 92 may be adjustably held in proper position on the shaft 81 but in FIG. 2 is shown maintained in a fixed position on the shaft by pressing on one side thereof against a retaining collar 96 which is positioned in a suitably shaped groove on the shaft 81. The other side of the hub is contacted by a ring or washer 97 which may be of any suitable construction, and in the form shown has a plurality of inwardly extending fingers 98 positioned in the spaces between the fingers or spokes 93 of the resilient member 87. The centrifugally responsive member 85 and the parts thereof just described are all held, with the resilient members 86 and 87 suitably flexed, in proper position on the shaft 81 by a lock nut 100. If additional spring loading for the centrifugally responsive device 85 is desired, a helical spring 101 may be positioned around the shaft 81 with one end bearing against a shoulder 102 formed on the collar 84 and at its other end bearing against an adjusting collar 103 threaded on the shaft 81.

It will be apparent that as the speed of the shaft 15, and shaft 81 attached thereto, increases, the flyweights 95 of the centrifugally operated device 85 will tend to move outwardly in the chamber 74 in a direction away from the shaft 81. Since the resilient member 87 is in a fixed position on the shaft, such movement of the flyweights 95 will cause the members 86 and 87 to flex and thus produce an axial movement of the collar 84 which is slidable along the shaft. This movement will in turn move the pin 82 in its slot 83 and produce a corresponding but limited movement of the actuating rod 78. In this manner, the disk on the end of the orifice regulating member 77 will be brought closer to the seat 76 of orifice 68, thereby causing the pressure to increase or build up in the pressure chamber 65.

Increased pressure in the chamber 65 will act upon the exposed surfaces of the cylindrical actuating plunger 55, and such pressure on the plunger 55, along with pressure on the exposed portions of the sloping surfaces 40 of the poppet valve 41 in valve chamber 37, will cause said valve to move and thereby open the passage into the conduit 24. Movement of the poppet valve as just described simultaneously brings valve surface 42 into contact with seat 43 so as to close the outlet or vent passage 48. This combined action allows a pressure pulse to flow through the conduit 24 to actuating device 18 and cause it to close the butterfly valve 17. As mentioned above, it is desired, in the described application of the speed sensor 30, to close the valve 17 when the shaft 13 reaches a speed of 12,000 r.p.m. Accordingly, the weight of the flyweights 95 and the design and adjustments of all of the associated parts are such that the centrifugal force created by rotation of said flyweights at a corresponding speed, will move the orifice regulating member 77 and create the predetermined pressure build-up in chamber 65 at or very close to this precise speed.

In the normal course of events occurring during the starting of the gas turbine 10, once the shaft speed of 12,000 r.p.m. is attained and the valve 17 closed as described, such shaft speed will increase above this rate to normal operating speed. With the flyweight device 85 set to operate at 12,000 r.p.m. to effect this closing of the valve 17, said valve will normally remain in its closed position during normal operation and will not open again until the turbine slows down to a rate below 12,000 r.p.m. Such slowing down will allow the flyweights 95 and associated parts to return to their FIG. 2 positions with the disk of the regulating member 77 moved away from the outlet surface 76 of orifice 68. This will allow the pressure in chamber 65 to vent, through orifice 68 and vent 75, and thus permit spring 61 to move the plunger 55 and associated poppet valve 41 back to the FIG. 2 position also. With the poppet valve in this position, the pressure in diaphragm chamber 22 of the pneumatic actuator 18 will then be permitted to vent through the conduit 24 and outlet passage 48 and thus allow spring 21 to move the actuating rod and open the valve 17. It will therefore be apparent that by means of the present invention, the compressor vent is open at starting shaft speeds up to a predetermined critical rate, whereupon said vent is closed and maintained in a closed position during normal operation of the turbine.

I claim:

1. In a governor of the type having a port through which the flow of fluid is controlled to operate the governor, means for controlling fluid flow through such port comprising: support means disposed for rotation in axial registration with such port; a flow controlling member guided on said support means for movement toward and away from such port; resilient means on said support means normally tending to move said flow controlling member in one direction relative to said port; means on said support means responsive to centrifugal force to move said flow controlling member relative to said port in opposition to said resilient means, said centrifugal force responsive means having a plurality of spaced hub members, one of said hub members being fixed to said support means and another being movable thereon and connected with said flow controlling member; and a plurality of equally spaced resilient fingers radiating from each hub member, the outer ends of the fingers on said hubs converging and having flyweights secured thereto, centrifugal force of said flyweights caused by rotation of said support means serving to move said hub members toward one another and impart movement to said flow controlling member.

2. In a governor of the type having a port through which the flow of fluid is controlled to operate the governor, means for controlling fluid flow through such port comprising: support means disposed for rotation in axial registration with such port; a flow controlling member guided on said support means for movement toward and away from such port; resilient means on said support means normally tending to move said flow controlling member away from said port; means on said support means responsive to centrifugal force to move said flow controlling member toward said port in opposition to said resilient means, said centrifugal force responsive means having a pair of hub members, one of which is fixed to said support means and the other is spaced from the first and guided for movement by said support means, the latter hub being connected with said flow controlling member; a plurality of equally spaced resilient fingers radiating from each hub member, the outer ends of said fingers converging; and flyweight means secured to the outer ends of said fingers, centrifugal force of said flyweights caused by rotation of said support means serving to move said hub members toward one another and impart movement to said flow controlling member.

3. In a governor of the type having a port through which the flow of fluid is controlled to operate the governor, means for controlling fluid flow through such port comprising: support means disposed for rotation in axial registration with such port; a flow controlling member guided on said support means for movement toward and away from such port; resilient means on said support means normally tending to move said flow controlling member away from said port; means on said support means for adjusting said resilient means to vary the force tending to move said flow controlling member away from said port; means on said support means responsive to centrifugal force to move said flow controlling member toward said port in opposition to said resilient means, said centrifugal force responsive means having a pair of hub members, one of which is fixed to said support means and the other is spaced from the first and guided for movement by said support means, the latter hub being connected with said flow controlling member; a plurality of equally spaced resilient fingers radiating from each hub member, the outer ends of said fingers converging; and flyweight means secured to the outer ends of said fingers, centrifugal force of said flyweights caused by rotation of said support means serving to move said hub members toward one another and impart movement to said flow controlling member.

4. In a governor of the type having a port through which the flow of fluid is controlled to operate the governor, means for controlling fluid flow through such port comprising: a shaft member disposed for rotation in axial registration with such port, said shaft member having an axial bore; a flow controlling member received by said bore for movement toward and away from such port; a collar guided for movement on said shaft member, said collar being connected with said flow controlling member; resilient means surrounding said shaft member and engaging said collar, said resilient means tending to move said flow controlling member away from said port; means on said support means responsive to centrifugal force to move said flow controlling member toward said port in opposition to said resilient means, said centrifugal force responsive means having a pair of resilient members each of which has a hub and a plurality of fingers radiating therefrom, the fingers being equally spaced around the hub and converging toward and secured to the fingers on the other hub; means securing one hub to said shaft member, the other hub being slidably received by said shaft member and having a motion transmitting relation with said flow controlling member; and flyweight means connected with the outer ends of said fingers, centrifugal force of said flyweights serving to move said hub members toward one another and said flow controlling member toward said port.

References Cited in the file of this patent

UNITED STATES PATENTS

| 1,090,807 | Warthen | Mar. 17, 1914 |
| 2,149,645 | Sittert | Mar. 7, 1939 |
| 2,328,902 | Grove | Sept. 7, 1943 |
| 2,441,811 | Gottlieb | May 18, 1949 |
| 2,674,229 | Karlen | Apr. 6, 1954 |
| 2,713,869 | Weisenback | July 26, 1955 |
| 2,841,161 | Lee | July 1, 1958 |
| 2,897,836 | Peters | Aug. 4, 1959 |
| 2,925,066 | Thorner | Feb. 16, 1960 |
| 3,060,951 | Audemar | Oct. 30, 1962 |

FOREIGN PATENTS

| 790,865 | Great Britain | Feb. 19, 1958 |